United States Patent Office 3,428,959
Patented Feb. 18, 1969

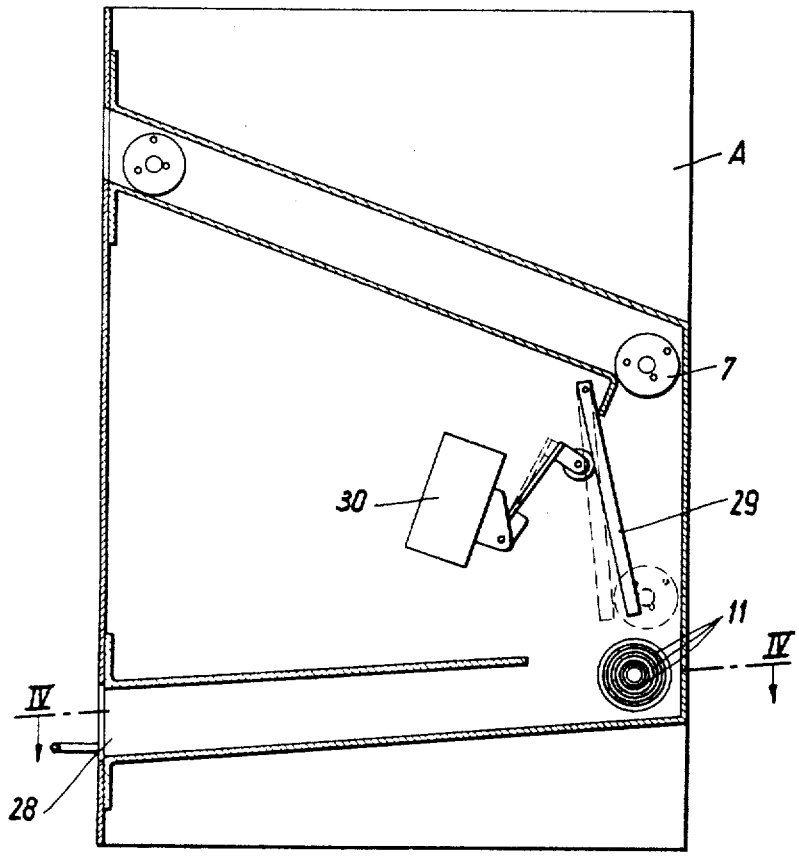
Fig. 3
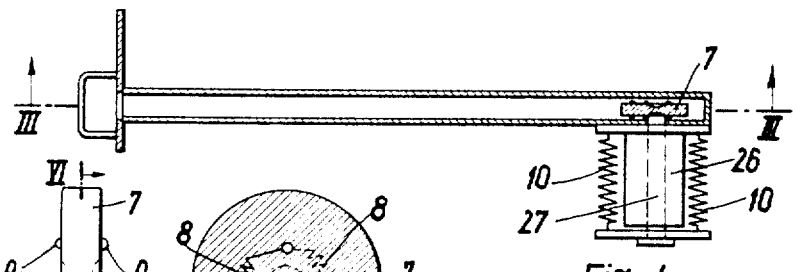
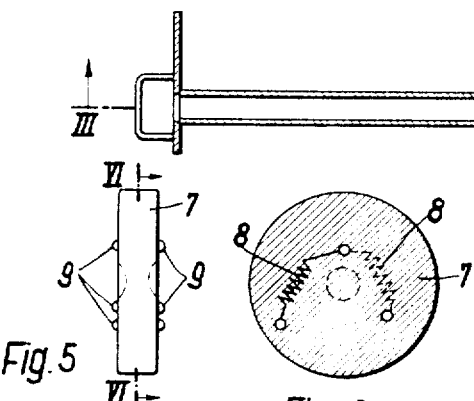
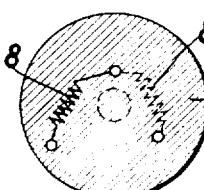
Fig. 5
Fig. 6
Fig. 4
Inventor:
NORBERT KARL ACKER
BY Hane and Nydick
ATTORNEYS

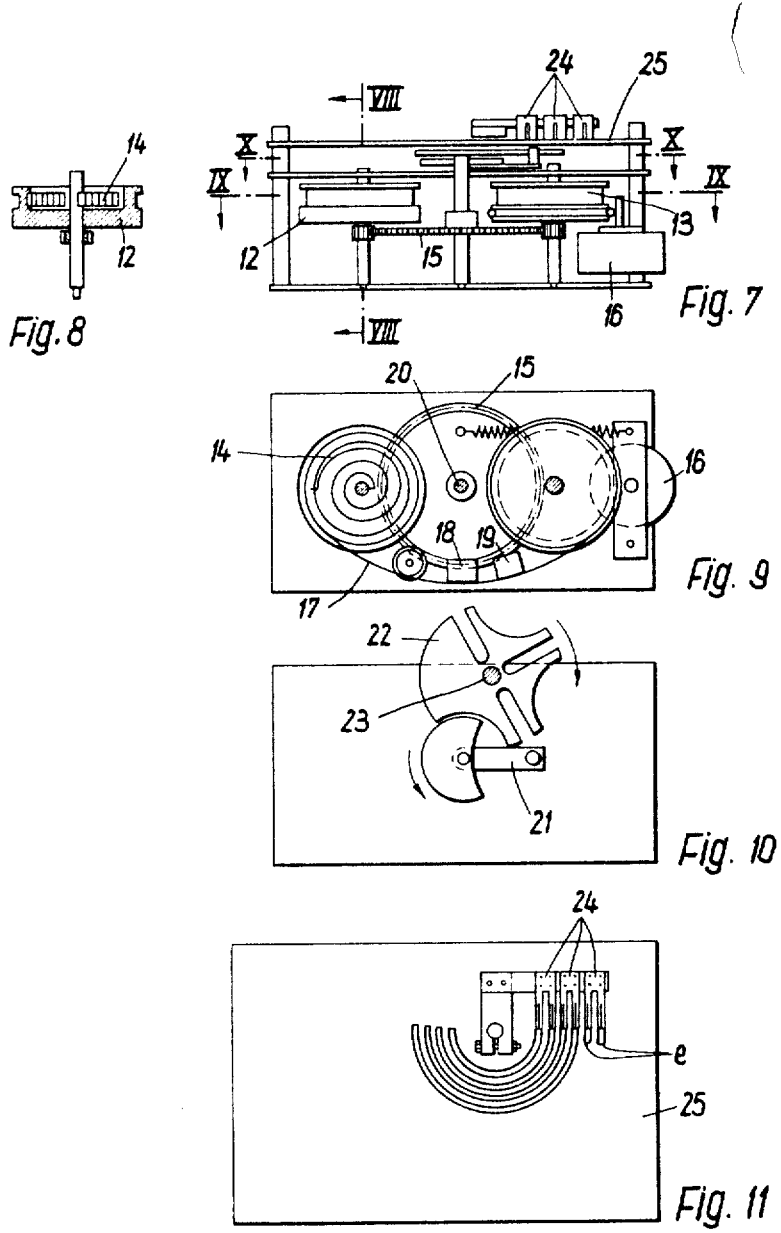

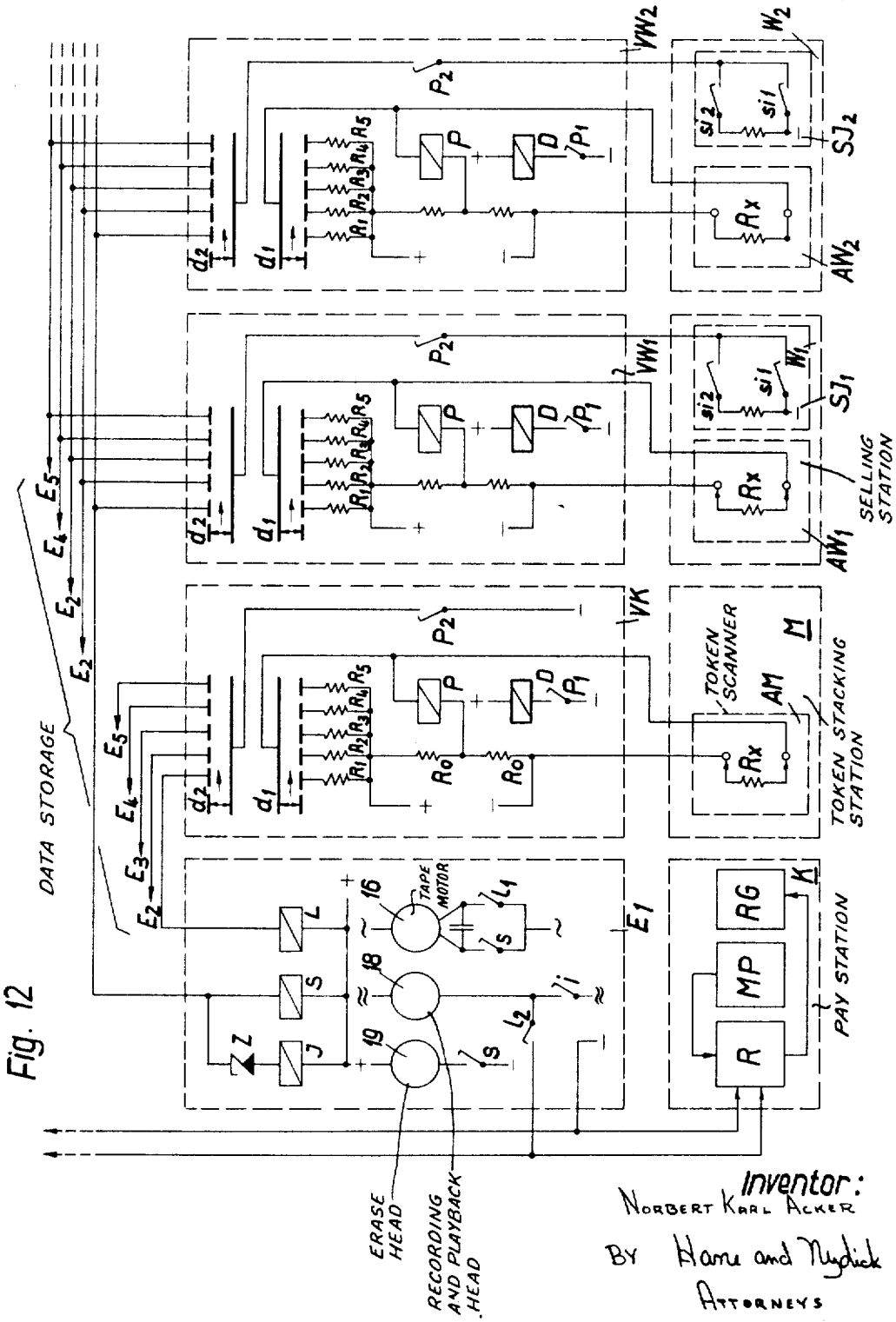

3,428,959
DEVICE FOR THE AUTOMATION OF CASH STATIONS IN SALES ESTABLISHMENTS
Norbert Karl Acker, Oelmuhlenweg 27a,
Konigstein, Taunus, Germany
Filed Mar. 22, 1966, Ser. No. 536,436
Claims priority, application Germany, Apr. 2, 1965,
A 48,818
U.S. Cl. 340—172.5                31 Claims
Int. Cl. G11b 13/00

ABSTRACT OF THE DISCLOSURE

A system for recording and charging costs-entailing transactions made by customers in a selected one of a plurality of selling stations in which a specific token or similar identifying article is supplied to each customer. The customer uses such token to activate a selling station selected for a purchase. Thereupon the token is automatically returned by the station to the customer for use in another selected selling station, if any. A storage means in each selling station records all purchases made by the customer in the respective selling station and then forwards such recordings to a common payment station in which the records pertaining to all purchases made by a customer are accumulated separately for each customer. When now the customer surrenders the token to the payment station the total bill is issued but the token is retained for further use by another customer.

---

The invention relates to a device for the automation of payment or cashier's stations in sales establishments with a plurality of selling stations. Sales establishments are here understood to mean establishments in the widest sense in which not only goods for taking away or immediate consumption are sold but also services or entertainment. It is immaterial whether the dispensing of the goods or the performance of the service is effected automatically or manually and whether payment is made at the payment station in advance or after the purchase.

In order to automate a payment station to automatic working, the individual price data of the goods supplied to the customers at the various selling stations must first be temporarily stored in order that they may automatically be calculated later at the common payment station with the customer.

Various systems have been proposed in order to render such intermediate storage of data possible wherein purchasing identifications which authorise purchase, are distributed to the customers.

In one known arrangement, keys are distributed to the customers by means of which the storage means assigned to a specific customer are operated from each selling station. In this case, each customer's key must have its own switch lock at each selling station. This is very expensive on the one hand, and very inconvenient for the customers on the other hand.

In other systems, the purchase data storage means are included in the purchase identifications, as a result of which these identifications are correspondingly bulky and awkward to handle. Also, the risk of fraud is relatively high because of the possibility of unauthorized manipulation.

Another important disadvantage which is common to the known systems is that, because of their nature and their switching function determined by the system, the purchasing identifications cannot be automatically distributed and recovered or can only be so with great difficulty, without encouraging fraudulent manipulation. It is precisely this disadvantage which makes all the known systems highly unsuitable for a fully automatic payment station.

With the automatic distribution of purchasing identifications, it is actually also required that only one purchasing identification should be released on an appropriate release signal and, if possible, should only then become visible to the customer.

After being returned, the purchasing identifications should again become invisible to the customers.

The present invention relates to an automation device which does not have the disadvantages of the known systems and, in addition, satisfies the requirements of a fully automatic cash operation while ensuring the maximum convenience for the customer during the purchase.

This is achieved in that convenient identity tokens are distributed as purchasing identifications to the customers and a stationary purchase store is associated with each identity token, Each selling station and the payment station have a scanning device which is common to all the identity marks, and Associated with each scanning device is a connecting device which hunts for the switch position corresponding to the identity token and so establishes the connection to the associated purchase data storage.

Different tokens may be used as identity marks which contain one or more electrical magnitudes, such as resistors, capacitors, oscillating circuits or the like and are provided externally with contacts through which the connection to the associated connecting device is established in the appropriate scanning device.

The connecting device is preferably an electrical tracking unit, for example a rotary selector, which, by means of a bridge circuit and electrical comparison values, hunts the switch position which corresponds to the electrical magnitude of the corresponding identity mark.

The outputs of all the connecting devices are connected in parallel and lead to the purchase data storages. Preferably, therefore, all the connecting devices are combined in one center, together with the purchase data storages.

The distinguishing tokens used as identity marks may be provided with recesses or raised portion or electrical connecting bridges which operate electrical contacts in the scanning device, for the particular switch position of which the connecting device then hunts.

Pulse counters, which can be interrogated electrically, may be used as purchase data storages if the individual items do not have to be listed in detail during the accounting later.

Preferably, however, the purchase data storages are magnetic-tape devices on which the price data are recorded in a pulse code or sound code during the recording run and reproduced during play back run by simply reversing the direction of travel of the tape. The erasing of the old data is then effected during renewed recording.

If the identity marks are round tokens, they may advantageously be stacked in a device which can issue them individually and receive them back again.

The token stacking device is preferably mounted at the payment station between the entrance and the exit for the customers. The entrance may have turnstiles which can be locked electro-magnetically, and a light-barrier control which ensures that only one token is issued to each incoming customer by the mark stacking device.

The exit may likewise advantageously have a turnstile which can be locked electro-magnetically, with an appropriate control which ensures that only one person can leave the sales establishment at one time and then only when a token has been returned to the token stacking device and the account prepared by the purchase store called up has been paid.

The payment station itself has a mechanical or electronic calculating and printing mechanism. This may be a cash register which has an electric input-device, for example a magnetic attachment for actuating the keys.

Furthermore, the payment station may have an independent coin box with a coin tester and the value of the coins inserted may be fed into the computer through the coin contacts in a known manner.

Finally, the payment station may also have a change-giving device which automatically returns the amount overpaid, determined by the computer, in a known manner.

The drawing represents diagrammatically one example of an embodiment of the invention.

FIGURE 3 shows a scanning device for the tokens;

FIGURE 4 is a section on the line 4—4 in FIGURE 3;

FIGURE 5 shows a token in side view;

FIGURE 6 is a section on the line 6—6 in FIGURE 5;

FIGURE 7 is a view of the tape-drive device from the front;

FIGURE 8 is a section on the line 8—8 in FIGURE 7;

FIGURE 9 is a section on the line 9—9 in FIGURE 7;

FIGURE 10 is a section on the line 10—10 in FIGURE 7;

FIGURE 11 is a plan view of the tape-drive device of FIGURE 7, and

FIGURE 12 is the circuit diagram for the effective electrical connections between a payment station, selling stations, connecting device and the purchase data storages in the form of magnetic-tape devices.

Figure 1:
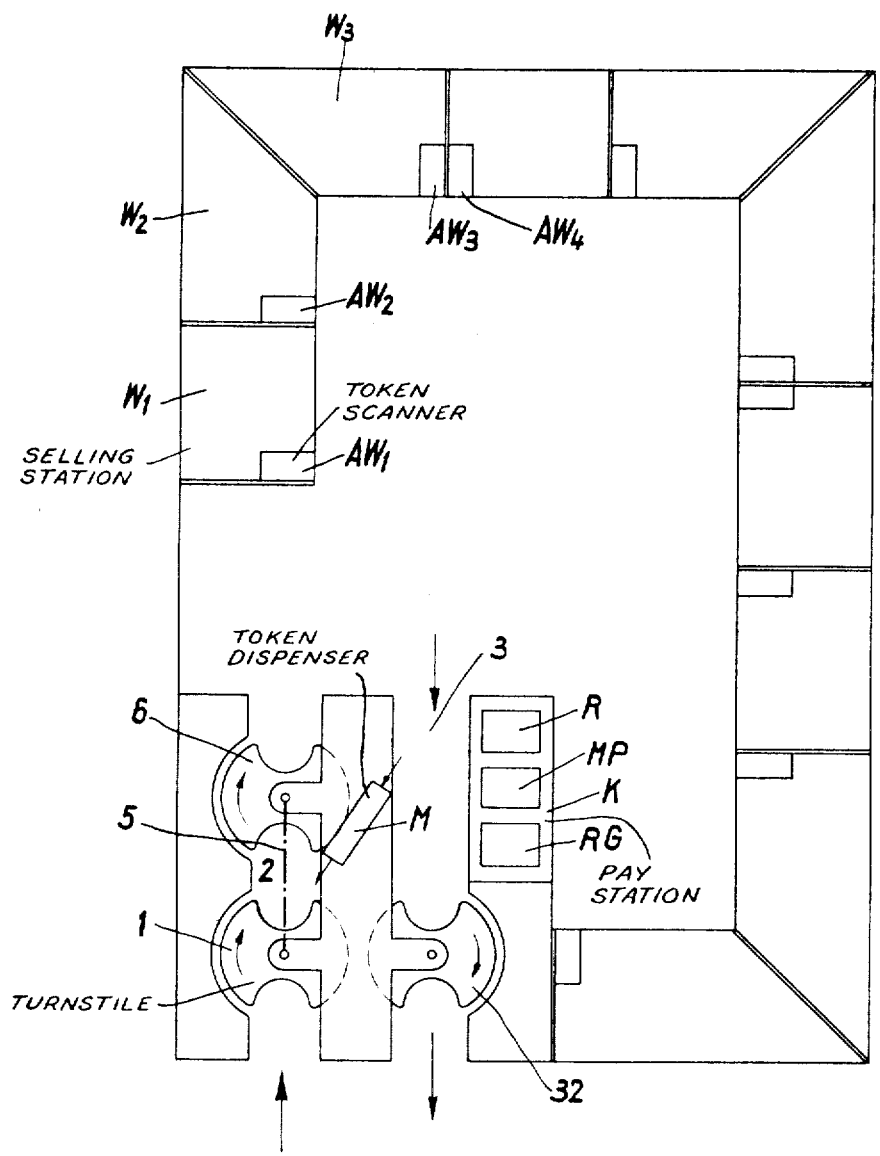
FIGURE 1 shows a plan view of a sales establishment with an automatic payment or cashier's station.
Figure 2:
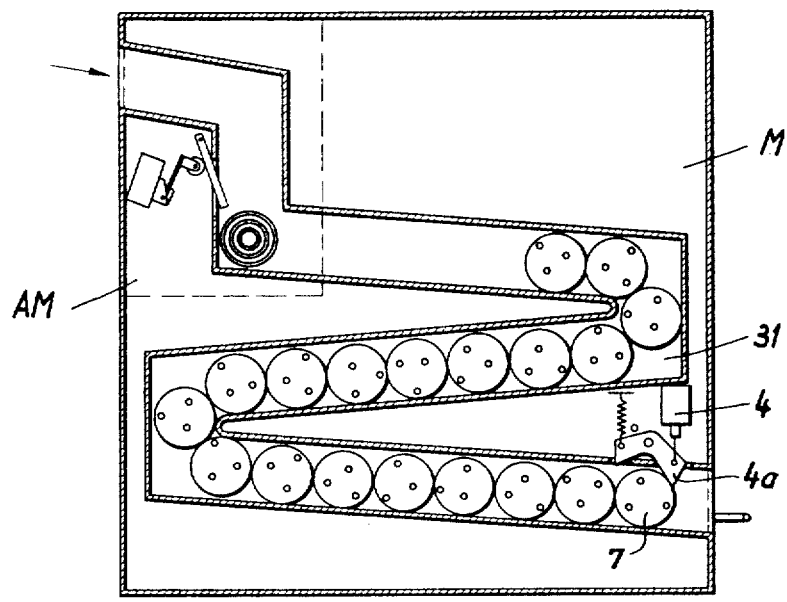
FIGURE 2 shows a stacking device for stacking different tokens to be supplied to customers.

When a customer enters the sales establishment through a turnstile 1 of an entrance 2, he actuates a key at the token stacking device M, whereupon one of a plurality of different tokens 7 is released by a release magnet 4 actuating a catch 4a.

A corresponding electrical control system in conjunction with a light barrier 5 ensures that, the turnstile 1 is locked by an electro-magnet as long as the customer is between the two turnstiles 1 and 6, that an electro-magnet holds the turnstile 6 locked until the customer has released a token, and that the customer can only actuate the release magnet 4 once. Both turnstiles have a reverse lock and can only be turned in one direction. Each token 7 contains one or more electrical resistors 8. The resistors of the tokens are different from one another. Externally, at both sides, the tokens have contacts 9 through which the resistors can be scanned.

When the customer inserts his token in a scanning or token detecting device A at a selling station W, a lever 29 is pressed against a microswitch 30 by the incoming token. This microswitch energises a magnet 26 and a plunger-type armature 27 thereof is withdrawn to provide a free passage for the token. After the token 7 has passed the lever 29, the lever swings back and the magnet is de-energised so that springs 10 can press the plunger-type armature 27 with its conical end into the corresponding recess in the token 7 which is thus pressed against a concentric contact ring 11 and centered. As a result, the resistor in the token 7 is connected to the connecting device V of the associated selling station.

The scanning devices A and the connecting devices V are additionally distinguished by the symbols of the control stations associated therewith.

The connecting device V includes a sensing means in the form of a resistance measuring-bridge, the contact bars $d_1$, $d_2$ of which are driven by an electrical drive D. This electrical drive may be a step-by-step mechanism or an electric motor. The relay P, which is preferably preceded by a trigger stage, responds so long as the resistor $Rx$ of the connected token 7 does not correspond to one of the probed comparison resistors $R_1$—$R_5$ interrogated. When the token resistor $Rx$ corresponds to a comparison resistor, voltage balance prevails in the measuring bridge and a relay P releases. The relay contact $p_1$ switches off the electrical drive D and the contacts $d_2$ are in the required position, that is to say the price signal, indicator SI of the corresponding selling station is connected to the purchase data storage E belonging to the token.

In the example described and illustrated, the token 7 has only one resistor which is balanced by one bridge. It is equally possible to provide the token with two or more resistors which are then balanced by two or more bridges.

A purchase data storage E is shown as a magnetic-tape device, the two tape reels 12, 13 of which are mutually tensioned by means of a spiral spring 14 through a gear wheel 15. The drive shaft of a reversible tape motor 16 is frictionally coupled with the tape reel 13 to drive the same whereby magnetic tape 17 is conveyed in known manner past the combined recording and reproduction head 18 and the erasing head 19. The shaft 20 of the gear wheel 15 turns a control arm 21 which acts on a Geneva wheel 22.

Secured to the spindle of this Geneva wheel are the slide bridges 24 which produce beginning-of-tape and end-of-tape signals respectively on a printed-circuit board.

Prices of the goods issued to the customers are transmitted in the form of pulses to the magnetic tape 17 at the price-signal indicator SI of the selling station, as known from vending machines. A corresponding control ensures that the contact $SI_2$ of the signal indicator SI is actuated first as a result of which only the relay S of the magnetic-tape device responds and the tape motor 16 starts in the recording direction. The relay I of the magnetic tape device is preceded by a Zener or avalanche diode Z, as a result of which relay I only responds to the higher voltage connected by the contact $SI_1$, in the sequence of the price pulses. The price pulses are then recorded on the magnetic tape by means of the magnetic head 18, preferably in the form of sound pulses from the contact $I_1$.

The price signal indicator SI can be controlled by hand through keys at a manual selling station and be operated in the manner known from the control of a vending machine at an automatic selling station.

After completion of the purchase at the corresponding selling station W, the purchaser or the vending machine operates a contact which energizes the locking magnet 26 at the scanning device A. As a result, the plunger-type armature 27 responds and releases the token 7 which now drops down and rolls back to the customer from the return opening 28.

Since there is now no longer any resistance applied, the connecting device V balances at the O position.

As many customers as there are different tokens and purchase data storages can make purchases at the various selling stations in the manner described.

After the purchase, the customer goes to the exit 3 and inserts his token 7 in the token stacking device M. There the token is first connected up to the connecting device VK associated with the payment station K by a scanning device AM associated with the token stacking device, and the connection to the associated magnetic-tape device is established in the manner described above. The relay L of the probed magnetic tape responds through the contact $p_2$, contact $L_1$ switches on the reverse travel of the tape motor and contact $L_2$ switches the magnetic head to the adding machine R of the payment station K. The pulses stored on tape are thus fed into the adding machine. After the last individual price has been put through, the corresponding sliding contact 24 closes the contact $e$ of the magnetic tape and emits the signal "end of tape," whereupon the adding machine terminates its adding operation and the printing mechanism issues the price ticket.

At the same time, the locking magnet 26 of the scanning device AM associated with the token stacking device M is switched on and releases the token which now rolls down into the stacking shaft 31 of the device.

The customer pays coins into a known coin-box device MP until the amount determined by the adding machine R is reached or exceeded. A known change-making device RG then returns any amount which has been paid in excess. When the customer has paid, a relay is energised which is held by its own contact. A break contact relay interrupts the locking magnet of the exit turnstile 32 which can now turn through half a revolution to allow one person to pass through. During this half revolution, a contact, which is actuated by this turnstile 32, allows the relay to release again and the exit turnstile is locked again.

What is claimed is:

1. An installation for registering costs-entailing transactions made by customers in selected ones of a plurality of selling stations, said installation comprising in combination:
   a plurality of different tokens to be dispensed one by one to a customer;
   a plurality of selling stations;
   a payment station common for payment of all transactions;
   a plurality of data storage means corresponding to the number of different tokens and each assigned to one of said tokens;
   a plurality of sensing means at each selling station, one for each token, and a corresponding plurality of sensing means at the common payment station, each of the sensing means at the selling stations and the corresponding sensing means at the payment station being responsive only to a predetermined one of said tokens; and
   a plurality of connecting means each controlled by one of the sensing means at the payment station and the corresponding sensing means at a selling station for connecting a token to the data storage means assigned thereto upon sensing the token to which the respective sensing means are responsive, activation of the sensing means at a selected selling station connecting the storage means assigned to the respective token for storage of data pertaining to transactions at the selected selling station, and activation of the corresponding sensing means at the payment station by the same token activating the storage means for releasing the stored data.

2. An installation according to claim 1 wherein each of said tokens comprises at least one electric circuit component having a selected electrical magnitude and external contacts connected to said component, said external contacts being connectable to the respective connecting means when the token is placed in one of said token detecting means.

3. An installation according to claim 2 wherein each of said connecting means comprises multiple-position switch means, each of the switching positions of said switch means corresponding to one of said different tokens, and wherein each of said tokens comprises control circuit means causing movement of the switching means into different switching positions, placement of the switch means in a position corresponding to a token in the detecting means establishing connection with the respective data storage means.

4. An installation according to claim 2 wherein each of said connecting means comprises a multiple-position switch means, each of the switching positions of said switch means corresponding to one of said different tokens, and wherein each of said connecting means comprises comparing means responsive to the electrical magnitudes of the respective token to activate the connecting means for establishing connection with the respective data storage means.

5. An installation according to claim 4 wherein each of said comparing means comprises bridge circuit means including an impedance means having an electrical magnitude corresponding to the electrical magnitude of one of said tokens and a movable contact element, and drive means for moving said contact element along an electrically conductive path including stationary contact elements connected to a token placed in said detecting means for detecting the electrical magnitude of said token, said bridge circuit means being in balance when the electrical magnitude of said impedance means corresponds to the electrical magnitude of the respective token, balance of the bridge circuit means causing said activation of the respective connecting means.

6. An installation according to claim 5 and comprising relay means connected in an energizing circuit with said drive means, said relay means being controlled by the state of balance of the bridge circuit means and controlling the energizing circuit of the drive means to disconnect the same in response to a condition of balance in the bridge circuit means thereby stopping the drive means.

7. An installation according to claim 6 wherein each of said tokens includes several circuit components and a corresponding number of bridge circuit means are provided, each of said bridge circuit means coacting with one of said circuit components when the token is placed in said detecting means.

8. An installation according to claim 1 wherein said connecting means are connected in parallel relationship to said data storage means.

9. An installation according to claim 1 wherein respective connecting means and respective data storage means are combined in a central station and electrically connected to each other.

10. An installation according to claim 9 wherein said central station further comprises coin testing means, and means for receiving coins and returning received coins representing a monetary value in excess of the monetary value of the stored data in the respective data storage means.

11. An installation according to claim 1 wherein each of said data storage means comprises electrically readable pulse counting means.

12. An installation according to claim 1 wherein each of said data storage means comprises tape recording means.

13. An installation according to claim 12 wherein said tape recording means comprise means for recording data on the tape in pulse form during a forward run of the tape, means for reproducing the recorded data pulses during a reverse run of the tape, and means for erasing recorded data pulses during the next following forward run of the tape.

14. An installation according to claim 12 wherein said tape recording means comprise a tape supply reel and a tape take-up reel, coacting gear means and spring means for tensioning the tape on said reels, a capstan frictionally engaged with said tape, and reversible drive means for driving said capstan.

15. An installation according to claim 14 and comprising electrical means for indicating the beginning and the end on the tape recording means, said indicating means including a first rotary shaft fixedly seating a gear of said gear means, a control arm seated on said shaft for rotation in unison therewith, a Geneva cross, a second rotary shaft seating said Geneva cross for rotation in unison therewith, said Geneva cross coacting with said control arm for rotation by the arm, slider contacts seated on said Geneva cross shaft for rotation in unison therewith, and stationary contact elements connected to said indicating means and slidably engaged by said slider contacts, the position of said slider contacts on the stationary contact elements controlling said indicating means to indicate the beginning and the end of the tape respectively.

16. An installation according to claim 15 and comprising pulse generating means at each selling station for transmitting pulses representing the price of a transaction to the tape of the respective tape recording means, said generating means including switch means which in response to an activation of the pulse generating means close an energizing circuit for the drive means of the respective tape recording means for driving the tape thereof in forward direction prior to the generation of pulses by said pulse generating means.

17. An installation according to claim 16 wherein said pulse generating means comprise manually operable switch means.

18. An installation according to claim 16 wherein said pulse generating means are connected to a vending machine at the respective selling station for operation of the pulse generating means by operation of the vending machine.

19. An installation according to claim 16 wherein said tape recording means comprise a control relay and a Zener diode connected in circuit with said control relay and said switch means of the pulse generating means, said relay being arranged to operate only in response to a voltage supplied thereto via said switch means and said Zener diode, operation of the relay means causing recording of the price indicating pulses on the tape of the respective tape recording means.

20. An installation according to claim 1 and comprising token dispensing means for dispensing and receiving said tokens one by one, said dispensing means being disposed adjacent to said common payment station.

21. An installation according to claim 20 and comprising an entrance gate for customers, an electro-magnetically controlled turnstile in said gate, and a photoelectrically controlled light barrier controlling said turnstile and controlled by withdrawal of a token from said token dispensing means to release the turnstile for a turning angle permitting passage of one customer.

22. An installation according to claim 20 and comprising an exit gate for customers, an electro-magnetically controlled turnstile in the exit gate, and control means controlling said turnstile to release same for a turning angle permitting passage of one customer and being controlled by means responsive to the return of a token to said dispensing means.

23. An installation according to claim 22 and also comprising control means further controlling the release of said exit gate and being controlled by payment receiving means.

24. An installation according to claim 22 and comprising adding means each connected with one of said data storage means for adding the data recorded in the same.

25. An installation according to claim 24 and comprising coin receiving and testing means operatively connected with said adding means to transmit thereto the sum total of the monetary value of received and tested coins.

26. An installation according to claim 1 wherein each of said token sensing means comprises a receiving chute for tokens, a stationary contact means connected to said connecting means and disposed in said chute, a solenoid means having a movable armature, spring means biasing said armature toward said contact means to retain a token inserted into the chute between the contact means and the armature, a switch connected in an energizing circuit with said solenoid means and having a switch arm pivotal between a switch opening position protruding into the path of a token passing through the chute and a switch closing position withdrawn from said path, said switch arm being disposed anterior of said contact means in the direction of passage of a token through the chute, a token passing through the chute first pivoting the arm out of its switch closing position into its switch closing position to cause retraction of the armature by magnetic attraction thereby permitting entry of the token between the contact means and the armature and then releasing the switch arm for returning into its switch opening position thereby freeing the armature for movement into its token retaining position by the action of said spring means.

27. An installation according to claim 26 wherein each of said tokens has a recess in its side facing the armature and said armature has a tip matching said recess to effect centering of a token placed in the detecting means on said contact means by the pressure of said spring means.

28. An installation according to claim 27 and comprising in each of the token sensing means release means for releasing a token retained by the armature, each of said release means including switch means operable for closing the energizing circuit of said solenoid means to effect retraction of the armature against the action of the spring means independent of the position of said switch arm.

29. An installation according to claim 1 and comprising an exit gate for customers, a token receiving means disposed adjacent to said exit gate, the token sensing means at the payment station being operable by placement of a token into said receiving means and operatively connected with the data storage means disposed at the payment station to activate the date storage means corresponding to the sensed token, adding means at the payment station connected with the data storage means at the payment station, actuating means for connecting each of the data storage means at the payment station with said adding means to transmit stored data thereto, and means for activating said actuating means to connect the adding means with the respective storage means for transmitting the data stored in said storage means to the adding means.

30. An installation according to claim 29 wherein said data storage means at the payment station are tape recording means, and said actuating means include means for driving the tape of said recording means in the direction for reproducing data recorded thereon.

31. An installation according to claim 30 and comprising switch means stopping the adding means upon completion of an adding operation and the tape recording means at the end of the tape, said adding means including printing means issuing a sales slip at the end of an adding operation.

References Cited

UNITED STATES PATENTS

| 3,309,673 | 3/1967 | Harris et al. | 340—172.5 |
| 3,335,407 | 8/1967 | Lange et al. | 340—172.5 |
| 3,344,408 | 9/1967 | Singer et al. | 340—172.5 |
| 3,355,576 | 11/1967 | Childers et al. | 235—61.7 |

PAUL J. HENON, *Primary Examiner.*

RAULFE B. ZACHE, *Assistant Examiner.*

U.S. Cl. X.R.

235—61.7